United States Patent
Engler et al.

(10) Patent No.: US 7,884,926 B2
(45) Date of Patent: Feb. 8, 2011

(54) COLOR MEASURING APPARATUS HAVING DIFFERENTLY OPERATING MEASURING DEVICES

(75) Inventors: Hans Engler, Schriesheim (DE); Werner Huber, Wiesloch (DE); Manfred Schneider, Bad Rappenau (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 662 days.

(21) Appl. No.: 11/833,735

(22) Filed: Aug. 3, 2007

(65) Prior Publication Data

US 2008/0030717 A1 Feb. 7, 2008

(30) Foreign Application Priority Data

Aug. 3, 2006 (DE) .................. 10 2006 036 226

(51) Int. Cl.
*G01N 21/00* (2006.01)
(52) U.S. Cl. ........................................................ 356/73
(58) Field of Classification Search .................. 356/73, 356/402
See application file for complete search history.

(56) References Cited

U.S. PATENT DOCUMENTS

| | | | |
|---|---|---|---|
| 3,778,541 A | 12/1973 | Bowker | |
| 3,878,384 A | 4/1975 | Bowker | |
| 3,878,544 A | 4/1975 | Bowker | |
| 5,141,323 A | 8/1992 | Kipphan et al. | |
| 6,009,214 A * | 12/1999 | Suggs | 382/312 |
| 6,285,803 B1 * | 9/2001 | Couwenberg et al. | 382/299 |
| 6,535,279 B1 | 3/2003 | Lampersberger et al. | |
| 6,683,704 B1 * | 1/2004 | Spears et al. | 358/483 |
| 2002/0093697 A1 * | 7/2002 | Spears et al. | 358/514 |
| 2002/0181033 A1 * | 12/2002 | Tandon et al. | 358/514 |
| 2003/0095301 A1 | 5/2003 | Berchtold et al. | |
| 2004/0213433 A1 | 10/2004 | Noffke et al. | |
| 2004/0213436 A1 * | 10/2004 | Noffke et al. | 358/504 |
| 2006/0023266 A1 * | 2/2006 | Ohara | 358/474 |

FOREIGN PATENT DOCUMENTS

| | | |
|---|---|---|
| DE | 22 43446 C2 | 3/1973 |
| DE | 299 18 640 U1 | 2/2000 |
| EP | 0 357 986 A2 | 3/1990 |
| EP | 1 154 260 A2 | 11/2001 |
| EP | 1470918 A2 | 10/2004 |

* cited by examiner

*Primary Examiner*—Kara E Geisel
(74) *Attorney, Agent, or Firm*—Laurence A. Greenberg; Werner H. Stemer; Ralph E. Locher

(57) ABSTRACT

An apparatus performs colorimetric measurements of printing materials. The apparatus for the colorimetric measurement of printing materials has two measuring devices operating with different resolutions for registering the surface of the printing material. The two measuring devices permit faster registration of color measured values on a printing material and thus accelerates the measuring operations.

16 Claims, 2 Drawing Sheets

COLOR MEASURING APPARATUS HAVING DIFFERENTLY OPERATING MEASURING DEVICES

CROSS-REFERENCE TO RELATED APPLICATION

This application claims the priority, under 35 U.S.C. §119, of German application DE 10 2006 036 226.8, filed Aug. 3, 2006; the prior application is herewith incorporated by reference in its entirety.

BACKGROUND OF THE INVENTION

Field of the Invention

The present invention relates to an apparatus for the calorimetric measurement of printing materials, having two measuring devices.

In order to monitor the results in printing processes, it is necessary to check the quality of the prints produced, either at regular intervals or continuously. This can be done first by visual checking by the operator of the printing press himself, but in any case this requires removal of the printing materials from the printing press. In addition, in this case the subjective impression of the printer always plays a role. For the purpose of objective measurement of printing materials, it is necessary to use color measuring instruments which register the printed image by use of sensors and in this way permit computational comparison of the printed image with a printing original.

Such a color measuring device is disclosed by published, European patent application EP 1 154 260 A2, corresponding to U.S. patent disclosure No. 2003/0095301 A1. This patent application shows a scanning method for the optical density measurement of printed images on a printing material, the printing material being scanned by sensors. In this case, printing materials are measured densitometrically. In order to initialize the measurement of the printing material, there are position marks on the printing material as reference objects at a specific distance from the color measuring strip to be measured. In order to register the reference objects, a further measuring head is provided, which is disposed downstream of the other measuring heads carrying out the color measurement. The measuring head is used to register the reference marks and therefore to trigger the measuring operation of the other measuring heads. Nothing is stated in EP 1 154 260 A2 about the type of design of the additional measuring head.

Published, European patent application EP 357 986 A2 discloses a further apparatus for color measurement. To this end, a three color simultaneous measuring head is used for the densitometric measurement, and a further three color simultaneous measuring head for the colorimetric measurement. Alternatively, a common simultaneous measuring head can also be used, which contains six optoelectronic converters, in whose beam paths three color filters are disposed for the densitometric measurement and three further color filters for the colorimetric measurement. In the first embodiment, one measuring head is configured for the color density measurement and the other measuring head is configured for the colorimetric measurement. However, in terms of their construction, the measuring heads according to EP 357 986 A2 are largely identical.

The aforementioned prior art has the disadvantage that although the measuring heads used for the color measurement measure very exactly calorimetrically or densitometrically, the measuring operation needs a relatively long time, since the color measurements are carried out only point by point and very many points have to be measured.

SUMMARY OF THE INVENTION

It is accordingly an object of the invention to provide a color measuring apparatus having two differently operating measuring devices which overcomes the above-mentioned disadvantages of the prior art devices of this general type, which permits faster registration of color measured values on a printing material and thus accelerates the measuring operations.

According to the invention, an apparatus for the colorimetric measurement of printing materials has two different measuring devices. According to the invention, as opposed to the prior art, the measuring devices operate with different geometric and/or optical, that is to say calorimetric, resolutions, which leads to a rough measurement being carried out first with the first measuring device, and it being possible in this way for any striking points in the printing material to be registered more quickly, while the calorimetric measurement is carried out very exactly with the second measuring device. The two differently operating measuring devices make it possible first to register a relatively large area of the printing material and then to measure critical points calorimetrically with an exactly measuring second measuring apparatus. This increases the operating rate of the color measuring device according to the invention and thus leads to faster color measuring operations. This is necessary in particular in the case of use in inline color measuring devices, which are employed in web-fed rotary printing presses and increasingly also in sheet-fed printing presses. In these color measuring devices, the printing materials are measured while still in the printing press, which leads to correspondingly more frequent measuring operations, little time being available for the measuring operation on account of the high printing speed. Of course, the apparatus according to the invention could also be used in the case of separate measuring tables, on which the printing materials are laid after the printing operation. A use in handheld measuring devices is also possible.

In a first refinement of the invention, provision is made for the different measuring devices to be combined in one measuring head. Such a configuration needs less overall space and thus permits the use of a plurality of measuring heads, for example in a measuring beam in an inline color measuring instrument or in a tabletop measuring instrument. In these two measuring apparatuses, there is then a measuring beam having a plurality of measuring heads, which is able to scan the surface of the printing material simultaneously with its plurality of measuring heads. This leads to further increases in the measuring speed.

It proves to be particularly advantageous that a measuring device registers a plurality of pixels on the surface of the printing material simultaneously. As a result of the simultaneous registration of a plurality of pixels on the surface of the printing material, the simultaneous registration of a plurality of measuring points is made possible and thus the measuring operation is accelerated. An optical measuring device in the form of a scanning device having a geometric resolution of about 200 dpi or better is particularly suitable for this purpose. This scanning device has a plurality of illuminating sources and a plurality of detectors, in order in this way to be able to register a plurality of pixels simultaneously. In addition, specific image regions on the printing material can be measured at a lower speed and other regions at a high speed. During the parallel measurement on a plurality of pixels in the printing material, it is also possible for a plurality of spectral ranges to be registered simultaneously on the printing material. In this case, the scanning measuring apparatus is primarily intended to make unpolarized measurements.

Advantageously, provision is additionally made for a second measuring device to measure the surface of the printing material calorimetrically. According to the present invention, the second measuring device is configured as a spectral measuring head, which has a relatively low geometric resolution but a high spectral color resolution for this purpose. Using the spectral measuring head, above all, test elements such as color measuring strips on the printing material can be measured accurately with high spectral resolution. Since there is a coarser geometric resolution in the region of about 15 dpi here, it is also possible for polarizing optics to be used without the measuring period being prolonged excessively.

A refinement of the invention proves to be particularly advantageous in which, by use of a computer, a comparison is made between the measured values from the first measuring device and the second measuring device. Since the color measured values from the first measuring device are not so accurate, by use of the second color measuring device measuring calorimetrically very exactly, the accuracy of the first scanning measuring device can be improved by a comparison of the measured values being performed in the measuring device by a computer. Such a comparison is carried out, for example, by the same color measuring elements on the printing material or the same pixels on the printing material being registered by both measuring devices. In this way, the two differently operating measuring devices can also be calibrated. In addition, in the event that polarizing optics are used in the second measuring device, conversion of the unpolarized measured values from the first measuring device is also possible, since the printing material is registered once unpolarized by the first measuring device and once polarized by the second measuring device. In order not to slow the measuring speed, this comparison is carried out only in the case of a few specific reference areas, which are measured one after another by both measuring devices. As a result, despite the comparison of the two measuring devices, rapid registration of printing materials is possible. This is important in particular when the color measured values registered are passed on immediately to a control device to control the inking units in the printing press, in order to control out any deviations in relation to the printing original determined on the printing material. In this case, the control loop is closed by the color measuring device, which permits an appropriately precise reaction to the color measured values.

It is, moreover, advantageous that the apparatus has one or more light sources for illuminating the surface of the printing material. In order to carry out an exact colorimetric measurement of the printing material, the printing material must be measured under a defined light source that has a constant spectrum. As a result of the use of a plurality of light sources, the simultaneous measurement of a plurality of pixels on the printing material can be implemented. In this case, use is preferably made of semiconductor light sources, which illuminate the region of the first and the second measuring device. Semiconductor light sources have the great advantage of a very long lifetime as compared with conventional lamps.

One refinement of the invention is distinguished by the fact that the first measuring device is a preview sensor, which is disposed upstream of the second measuring device in the direction of travel of the measuring apparatus. This embodiment of the invention can be implemented either alternatively or in addition to the embodiments described previously. In the case of additional use, the preview sensor is then a third measuring device, which supplements the scanning measuring device and the second spectrally measuring color measuring device. The preview sensor is disposed in such a way that it scans the surface of the printing material before the spectrally measuring color measuring device. This preview sensor does not operate spectrally and is configured in such a way that it has a fine geometric resolution for the registration of lightness differences. As a result of this different configuration, the preview sensor is well suited to detect the start and end of measuring areas in color measuring strips. This makes it possible to carry out the registration of color measured values only when the spectrally measuring color measuring device is over a measuring area. Intermediate spaces and boundaries between color measuring areas can then be traveled over swiftly, so that the measuring operation is accelerated.

Advantageously, provision is made for measuring operations of the second measuring device to be triggered by signals from the first measuring device. The signals from the preview sensor are used for the purpose of controlling the second measuring head and performing measuring scans only when a sensible measurement is possible. As a result, by use of the preview sensor, in a preferred manner output signals are sent to the second spectral measuring device in order to control the exposure time of the spectral measuring head. In addition, the exposure times of the spectral measuring head are synchronized with the areas of the color measuring strip registered by the preview sensor. This is because, by use of the preview sensor according to the invention, the boundary and therefore the positions of the start and end of a color measuring area to be measured can be determined, so that the exposure time of the spectral measuring head can then be optimized. In order to calculate the exposure times, the relative speed between the color measuring system and the printing material additionally has to be registered; in addition the distance between the spectral measuring head and the preview sensor must be known by the measuring system. This offers the great advantage that the spectral measuring head does not continuously carry out many short measurements, as is necessary in the prior art, since it is not known when a measuring area ends or starts. Instead, in the present invention, a relatively long exposure phase is carried out under the control of the preview sensor only over the color measuring area that is to be measured. This longer phase of the exposure leads to improved measuring results as compared with averaging over a plurality of short measurements.

Advantageously, provision is additionally made for the apparatus to have one or more illuminating devices and for the illuminating devices to be controlled by output signals from the first measuring device. In this case, in addition to the exposure time, the preview sensor can also drive the illumination intensity of the illuminating devices, so that, during measurements by the second spectrally measuring device, the suitable illumination intensity can be set. The illuminating devices therefore do not always have to burn with constant or full power. Since the preview sensor reliably registers the lightness of the measuring area to be registered, the suitable setting of the illumination sources is possible without difficulty. A line sensor is particularly suitable as preview sensor, so that the measuring corridor of the spectrally measuring second color measuring device can be registered. On the other hand, the second spectrally measuring color measuring device measures the color of the color measuring strips on the printing material point by point and exactly.

Other features which are considered as characteristic for the invention are set forth in the appended claims.

Although the invention is illustrated and described herein as embodied in a color measuring apparatus having two differently operating measuring devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
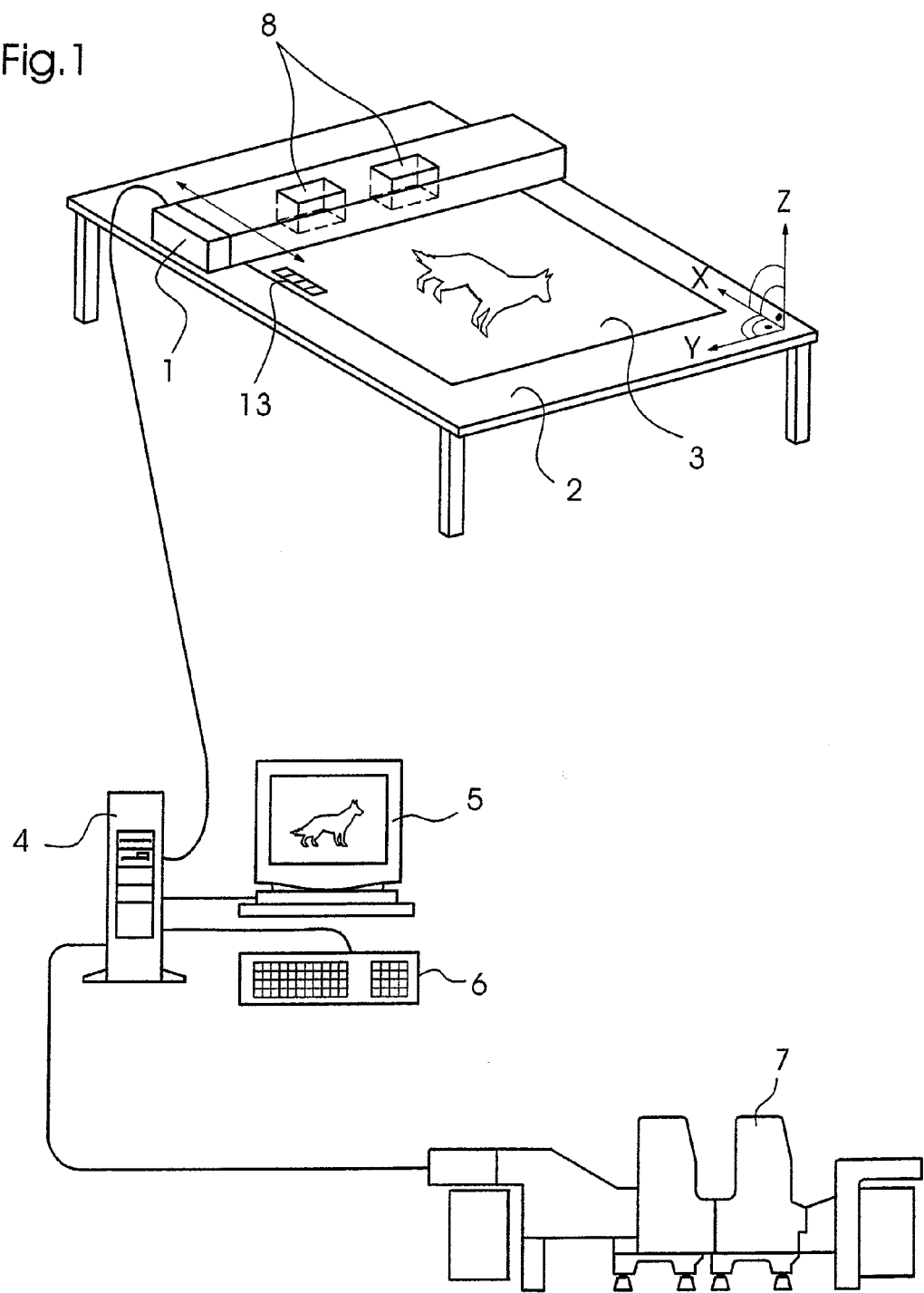
FIG. 1 is a diagrammatic, perspective view of a tabletop color measuring device with a plurality of measuring heads having differently operating measuring devices.

Referring now to the figures of the drawing in detail and first, particularly, to FIG. 1 thereof, there is shown a measuring table 2 which has a movable measuring beam 1. The measuring beam 1 has an electric drive, so that the measuring beam 1 can be moved from left to right or vice versa in the x direction over the printing material 3 lying on the measuring table 2. As the measuring beam 1 moves over the printing material 3, the printing material 3 is measured calorimetrically by use of measuring heads 8 in the measuring beam 1. It can be seen that on the printing material 3, in addition to the actual printed image, color measuring areas 13 in the form of a color measuring strip are applied to the lower end. The color measuring areas 13 are used for color monitoring and have specific standardized characteristics, such as specific hues. The color measured values registered by the measuring beam 1 are passed on to a computer 4, which displays the measured values to the operator on a monitor 5. In order to control the measuring operations, the operating personnel can make entries via a keyboard 6. In addition, the computer 4 is connected to the machine computer of a printing press 7, so that the measured color results from the computer 4 can be used directly to control the inking units in the printing press 7. If deviations are determined between a printing original and the printing material 3 to be measured, these deviations can be controlled out appropriately in the inking units in the printing press 7. The measuring apparatus in FIG. 1 is capable of registering both the lateral color measuring areas 13 and the entire printed image on the printing material 3; for this purpose, measuring heads 8 in the measuring beam 1 can be moved sideways in the y direction by a further electric drive.

Figure 2:
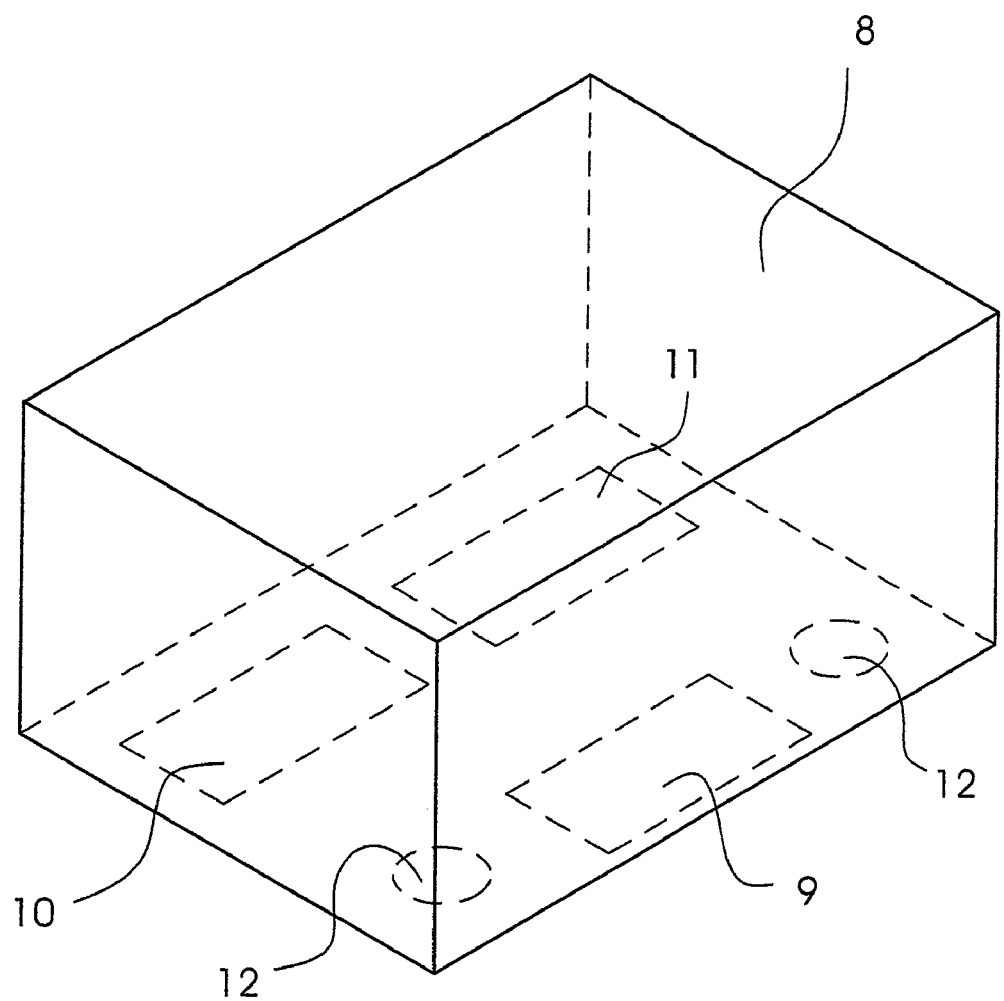
FIG. 2 is a perspective view of the measuring head having differently operating measuring devices.

In FIG. 2, the measuring head 8 from the measuring beam 1 in FIG. 1 is illustrated in more detail as an example. It can be seen that the measuring head 8 contains a plurality of measuring devices 9, 10, 11. If the direction of travel of the measuring beam 1 in FIG. 1 runs from left to right during the measuring operation, then a preview sensor 9 is located disposed in front of and on the right of the further measuring devices 10, 11. The preview sensor 9 is constructed as a line sensor, which has a high geometric resolution for the registration of light/dark differences. By use of the preview sensor 9, it is possible to register the start and end and also the position of color measuring areas 13 on the printing material 3 exactly. Therefore, rapid subsequent positioning of the spectral measuring device 10 over the color measuring area 13 to be measured is possible. The spectral measuring device 10 does not have to have a particularly high geometric resolution; instead it measures with a high colorimetric spectral resolution in order to be able to register color measured values exactly. As a result of the detection of the exact position of the color measuring area 13, the spectral measuring device 10 does not have to carry out short measurements continuously but can measure the color measuring areas 13 to be registered precisely with a correspondingly longer exposure time. Between the measurements, the entire measuring head 8 can be moved quickly, since the preview sensor 9 registers the position of the next color measuring area 13 quickly and exactly in advance. As a result of skipping the regions on the printing material 3 that are not to be measured, the measuring beam 1 can thus be moved more quickly from left to right, which shortens the time of the entire measuring operation. The preview sensor 9 in FIG. 2 can additionally control the illuminating devices 12 which are used for defined illumination of the color measuring areas 13 to be measured on the printing material. By use of the light/dark measurements of the preview sensor 9, the illumination intensity of the illuminating devices 12 can thus be regulated as a function of the lightness of the detected color measuring area 13.

The measuring head 8 in FIG. 2 additionally has a scanning measuring device 11, which likewise operates with a relatively high geometric resolution of 200 dpi. The scanning measuring device 11 primarily has measuring heads 8 which, in the measuring beam 1 in FIG. 2, do not measure in the lateral regions in which the color measuring areas 13 are located but which are intended to register the entire printed image on the printing material 3 like a scanner. The scanning measuring device 11 is capable of registering a large number of pixels on the printing material 3 simultaneously, in order in this way likewise to permit a more rapid measuring operation. However, the color measuring accuracy of the scanning measuring device 11, exactly like that of the preview sensor 9, is lower than that of the spectral measuring device 10. In order nevertheless to achieve a high colorimetric measuring accuracy, the measured results from the scanning measuring device 11 or the preview sensor 9 are compared in the computer 4 with the measured values from the spectral measuring device 10. In this way, the scanner 11 and the preview sensor 9 are calibrated calorimetrically, as described further below, by the spectral color measuring device 10. Because of their high geometric resolution, the sensors 9 and 11 can also be used to detect register marks or register crosses on the printing material 3, in order in this way to detect register deviations between the individual color separations or register deviations between the front and rear side. For this purpose, however, the sensors must have a resolution of at least 1000 dpi, which can be achieved by changing the sensors to a fine measuring mode. Although this slows down the measuring speed, it is not necessary for the entire sheet 3 to be measured in this mode; it is sufficient to register the regions having the register marks and register crosses, which are physically very limited. Via the computer 4, the deviations can be corrected for the following printing materials 3 by control interventions in the printing press 7. Furthermore, the sensors 9, 11 can be used for the purpose of registering bar codes on the printing material 3. If a deviation is established, the computer 4 registers this as a reject, and the sheet 3 is separated out. A resolution of 200 dpi is sufficient for this purpose. With this resolution, the sensors 9, 11, together with the computer 4, can also check texts on the sheet 3 for correctness and thus, for example, can detect false inscriptions on medicament packs, which are then likewise separated out.

As already explained, the spectral measuring device 10 primarily registers calorimetrically standardized color measuring areas 13. The spectral measuring device 10 operates calorimetrically very exactly. If reference areas like these standardized color measuring areas 13 that are present on the printing material 3 are registered both by the spectral measuring device 10 and by the scanning measuring device 11, then the measured values from the two devices 10, 11 can be compared with one another. Calibration of the spectral measuring device 10 by the scanning measuring device 11 is also possible. In this way, the speed of the scanning measuring device 11 can be combined with the high color accuracy of the spectral measuring device 10 and, in this way, create an accurate and fast color measuring apparatus. The measuring heads 8 in the measuring beam 1 in FIG. 1 can either all be constructed like the measuring head 8 in FIG. 2 but it is also possible for the measuring heads 8 in each case to have only one preview sensor 9 and one spectral measuring device 10, or for the measuring heads 8 to have one spectral measuring device 10 and one scanning measuring device 11. Of course, it is also possible for some measuring heads 8 in each case to have two of the sensors 9, 10 or 10, 11, and other measuring heads 8 to have all three measuring devices 9, 10, 11.

The invention claimed is:

1. An apparatus for colorimetric measuring of printing materials, the apparatus comprising:
    two measuring devices operating with different resolutions for registering a surface of the printing material;
    one of said measuring devices having a higher geometric resolution than another of said measuring devices;
    said measuring devices including a first measuring device registering a plurality of pixels on the surface of the printing material simultaneously and a second measuring device measuring the surface of the printing material colorimetrically; and
    a computer connected to said measuring devices, said computer performing a comparison between measured values from said first measuring device and said second measuring device.

2. The apparatus according to claim 1, wherein said two measuring devices are combined in one measuring head.

3. The apparatus according to claim 2, further comprising a measuring beam having a plurality of measuring heads.

4. The apparatus according to claim 1, wherein said second measuring device has polarizing optics.

5. The apparatus according to claim 1, further comprising at least one light source for illuminating the surface of the printing material.

6. The apparatus according to claim 1, wherein said measuring devices detect register marks or register crosses on the printing material.

7. The apparatus according to claim 1, wherein said measuring devices register bar codes on the printing material.

8. The apparatus according to claim 1, wherein said measuring devices carry out color measurements on the printing material.

9. The apparatus according to claim 1, wherein one of said measuring devices has a geometric resolution of at least 200 dpi.

10. An apparatus for colorimetric measuring of printing materials, the apparatus comprising:
    two measuring devices operating with different resolutions for registering a surface of the printing material;
    one of said measuring devices having a higher geometric resolution than another of said measuring devices;
    said measuring devices including a first measuring device registering a plurality of pixels on the surface of the printing material simultaneously and a second measuring device measuring the surface of the printing material colorimetrically;
    said first measuring device being a preview sensor disposed upstream of said second measuring device in a direction of travel of the apparatus; and
    measuring operations of said second measuring device being triggered by signals from said first measuring device.

11. The apparatus according to claim 10, wherein said preview sensor registers lightness differences on the surface of the printing material.

12. The apparatus according to claim 10, wherein an exposure time of said second measuring device is controlled by output signals from said first measuring device.

13. An apparatus for colorimetric measuring of printing materials, the apparatus comprising:
    two measuring devices operating with different resolutions for registering a surface of the printing material;
    one of said measuring devices having a higher geometric resolution than another of said measuring devices;
    said measuring devices including a first measuring device registering a plurality of pixels on the surface of the printing material simultaneously and a second measuring device measuring the surface of the printing material colorimetrically;
    said first measuring device being a preview sensor disposed upstream of said second measuring device in a direction of travel of the apparatus; and
    at least one illuminating device, said at least one illuminating device being controlled by output signals from said first measuring device.

14. An apparatus for colorimetric measuring of printing materials, the apparatus comprising:
    two measuring devices operating with different resolutions for registering a surface of the printing material;
    one of said measuring devices having a higher geometric resolution than another of said measuring devices;
    said measuring devices including a first measuring device registering a plurality of pixels on the surface of the printing material simultaneously and a second measuring device measuring the surface of the printing material colorimetrically;
    said first measuring device being a preview sensor disposed upstream of said second measuring device in a direction of travel of the apparatus; and
    said first measuring device registering a position or outlining a color measuring area on the surface of the printing material.

15. An apparatus for colorimetric measuring of printing materials, the apparatus comprising:
    two measuring devices operating with different resolutions for registering a surface of the printing material;
    one of said measuring devices having a higher geometric resolution than another of said measuring devices;
    said measuring devices including a first measuring device registering a plurality of pixels on the surface of the printing material simultaneously and a second measuring device measuring the surface of the printing material colorimetrically; and
    a computer coupled to said measuring devices, said computer comparing measured values registered with said one measuring device and/or the other measuring device with predefined reference values, and regulation being carried out in a printing press by said computer in an event of deviations from the predefined reference values.

16. A printing press, comprising:
    an apparatus according to claim 1.

* * * * *